July 25, 1950 J. J. SHEEHY 2,516,264
INSECT ELECTROCUTION TRAP
Filed March 20, 1947
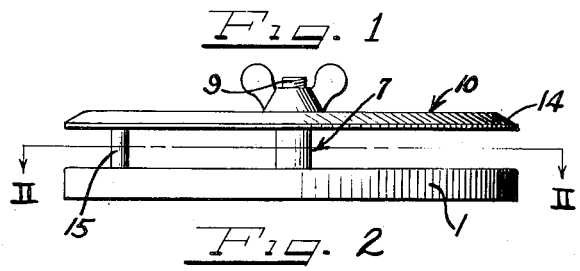
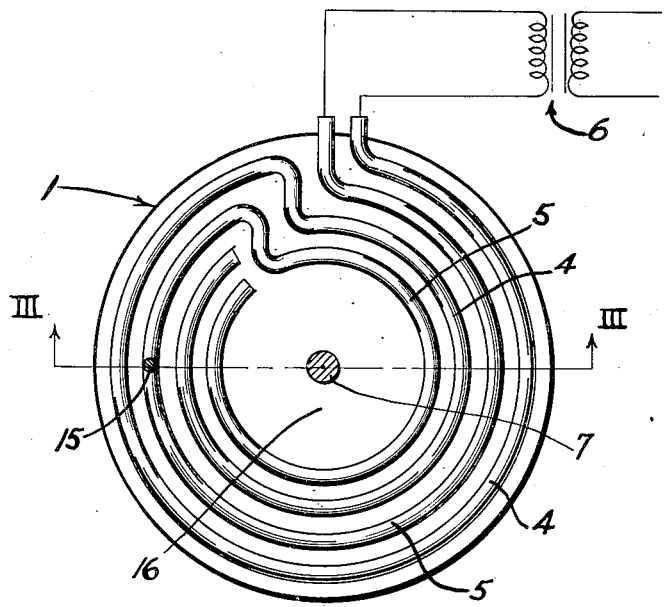
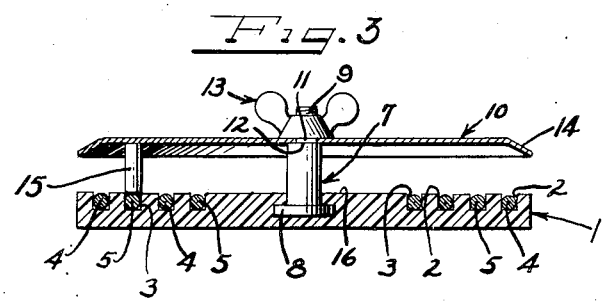
Inventor
Joseph J. Sheehy Patented July 25, 1950

2,516,264

UNITED STATES PATENT OFFICE 2,516,264

INSECT ELECTROCUTION TRAP

Joseph J. Sheehy, Downey, Ill.

Application March 20, 1947, Serial No. 735,857

3 Claims. (Cl. 43—112)

This invention relates to improvements in an insect electrocution trap, and more particularly to an electrocution trap adapted to electrocute smaller animals such as insects, but to positively repel larger animals, as for instance rodents, which, for safety, sanitary or other reasons, should not be trapped.

In the past, insect traps, sufficiently safe as to be acceptable to insurance underwriters, have not been sufficiently economical and acceptable for use in homes, restaurants, and similar locations. A frequent reason for this difficulty was the fact that larger animals, such as rodents, were susceptible to being caught therein and remain for long periods of time with electrical current passing through their bodies, with the consequent undesirable results, and, in many cases, danger. A further difficulty has been that the devices were not sufficiently compact and convenient to operate and clean.

With the foregoing in mind, it is an important object of the instant invention to provide an electrocution trap designed to receive smaller animals, such as insects, but to positively repel larger animals such as rodents.

A further object of the instant invention is the provision of an economical electrocution trap for insects which is suitable for use in homes, restaurants, and other similar locations.

It is also a feature of the instant invention to provide a charged canopy over a floor plate having circular coils of opposite polarity imbedded therein, the outer coil being oppositely charged with respect to the canopy, so that large animals cannot enter the trap, but will be positively repelled by means of an electric shock.

Still another object of the invention resides in the provision of an electrocution trap of simple construction which may be quickly, easily and completely cleansed and which is so constructed as to prevent dust, dirt and other matter from accumulating between and around the charged elements of the trap.

It is also a feature of the instant invention to provide an insect electrocution trap having its charged elements imbedded in a circular floor plate in such a manner that dirt, dust or other material cannot accumulate between and around the conductors, and wherein a canopy is provided to prevent dust and dirt from falling into the trap.

It is also an object of the instant invention to provide an insect electrocution trap which is so designed that only a pair of conductors need be used in the trap, but which is efficient and sure in the electrocution of insects.

A further object of this invention is the provision of an electrocution trap having open circuit conductors between which the circuit may be closed by the body of an insect or the like for long periods of time with no objectionable fire hazard.

While some of the more salient features, characteristics and advantages of the instant invention have been pointed out, others will become apparent from the accompanying disclosures, taken in conjunction with the accompanying drawings, in which:

Figure 1 is an elevational view of an insect electrocution trap embodying principles of the instant invention;

Figure 2 is a plan sectional view through the insect electrocution trap taken substantially as indicated by the line II—II of Figure 1, looking in the direction of the arrows, with a portion of the electric power supply circuit to the trap shown diagrammatically; and Figure 3 is a vertical sectional view partly in elevation taken substantially as indicated by the line III—III in Figure 2.

The illustrated embodiment of the instant invention includes a circular floor plate 1 of a plastic, ceramic, or equivalent insulating material, preferably a material which is somewhat wear resistant, and is readily cleansable. As best seen in Figures 2 and 3, the circular floor plate 1 has a pair of radially spaced generally circular grooves 2 and 3 which are adapted to receive a pair of convolute conductors 4 and 5, respectively. The conductors 4 and 5 may be connected by any suitable means as schematically illustrated, to the high voltage terminals of a high tension step-up transformer 6 (Figure 2). Since the conductors are nowhere directly connected electrically, a substantial voltage may exist between them. The conductors 4 and 5 and grooves 2 and 3 are so constructed that the upper surfaces of the conductors are substantially flush with the top surface of the circulate floor plate 1. If desired, suitable conducting or insulating material may be employed to prevent dirt or grit from becoming imbedded between the wire and the groove, as for instance, solder (not shown).

The low voltage terminals of the transformer 6 may be connected to the usual alternating current power outlet. The transformer 6, for example, may be adapted to supply voltage of from 5000 to 7500 volts at a current of 5 milliamperes. The resistance of the conductors 4 and 5 will preferably be relatively high, as for example 500 or more ohms. Current-boosting apparatus, such as a spark coil, may, of course, be used as will be apparent to those skilled in the art.

Centrally of the floor plate 1 is an upstanding bolt 7 having an enlarged end flange 8 rigidly embedded in the floor plate 1 and a threaded upper end 9 of reduced diameter, as best shown in Figure 3. A canopy or cover 10 of conductive material has a central opening 11 of somewhat larger diameter than the reduced threaded portion 9 of the bolt 7. The cover 10 is adapted to fit over the reduced diameter threaded portion 9 of the bolt 7 and rests upon an annular shoulder 12 of the bolt 7. A wing nut 13 threads onto the reduced threaded portion 9 of the bolt 7 to clamp the cover 10 against the shoulder 12. The cover 10 has an outer annular downwardly sloping portion 14, the space between which and the floor plate is such as to permit the entry of smaller animals such as insects, but to prevent entry of larger animals such as rodents.

Electrically contacting the innermost conductor 5 is a conductive post 15. This post has a height slightly greater than the height of the shoulder 11 of the bolt 7 above the floor plate 1. The post 15 may be electrically connected to the conductor 5 as by soldering so as to furnish an electrical connection to the canopy 10. Because of the slightly greater height of the post 15, there is a slight springing of the canopy 8 when the wing nut 13 is tightened to hold the central portion of the canopy tightly against the shoulder 11. Good electrical contact is thus assured between the canopy 10 and the post 15.

Since the conductors 4 and 5 are connected to different terminals of the transformer 6, it will be seen that a potential is thus established between the canopy 10 and the outermost conductor 4. When a larger animal, such as a rodent, approaches the trap, seeking some bait which may be placed in the central portion 16 of the plate 1 around the bolt 7, and inserts its head into the trap between the canopy and the first conductor 4, the animal will receive a severe electrical shock and will therefore be positively repelled from the trap. Should such animal be killed or rendered unconscious by the shock it will obviously fall outside the trap. On the other hand, smaller animals such as insects, will not come into contact with the canopy 10 and will therefore continue somewhat radially inwardly toward the bait in the center. The conductors 4 and 5 are so arranged that the body of the insect will simultaneously contact both conductors. The animal thus serves to short circuit the two conductors and electrocution will result. Referring to Figure 2, it will be seen that should the animal pass the outer conductor 4, the animal must still pass over another turn of each conductor, substantially the same potential difference existing between all adjacent turns of the conductors, so that there is little probability that the insect or other small animal would be able to gain access safely to the central portion of the floor plate and then escape.

For cleaning, the power supplied to the conductors is first disconnected by any suitable means (not shown). The device then is picked up and the dead animals knocked into any suitable receptacle. If desired, of course, the canopy 10 can be removed to facilitate cleaning.

From the foregoing, it is apparent that I have provided a simple, economical and safe electrocution trap for insects and the like, which trap is simple in construction, highly durable, requires little space, and is easily used and serviced.

It will, of course, be understood that various details of construction may be varied through a wide range without departing from the principles of this invention, and it is therefore, not the purpose to limit the patent granted hereon otherwise than necessitated by the scope of the appended claims.

I claim as my invention:

1. An insect electrocution device including a circular floor plate of non-conducting material having a pair of convolute grooves therein, a portion of each groove extending around the outer peripheral portion of said floor plate in spaced relation to the other, a pair of bare conductors resting in said grooves, means for supplying a potential difference to said conductors, a conductive post projecting upwardly from the inner conductor of the floor plate, a conduction canopy resting on said post and spaced above said floor plate at such a distance that animals of greater than predetermined size cannot enter said trap, whereby a potential difference is established between the outer wire in the peripheral portion of said floor plate and said canopy to give animals of a size greater than that to be admitted into the trap an electric shock.

2. An electrocution trap including a circular floor plate of insulating material having a pair of convolute grooves therein, a pair of bare conductors resting in said grooves, a bolt having a shoulder thereon projecting upwardly from said floor plate, an upright of conductive material projecting upwardly from one of said conductors slightly higher than the shoulder portion of said bolt, a conductive canopy adapted to rest on the shoulder of said bolt and be held thereby in spaced relation to said floor plate, whereby electrical contact is established between said upright and said canopy and said canopy assumes a potential with respect to the other of said conductors.

3. An insect electrocution device comprising a non-conductive floor plate having a plurality of substantially concentric grooves formed therein, a pair of bare conductors disposed in said grooves and lying substantially flush with the upper surface of said plate, means for supplying a potential difference to said conductors, a conductive canopy of substantially the same size and configuration as said floor plate, means for supporting said canopy in spaced relation above said floor plate at such a distance that animals of greater than a predetermined size cannot enter said trap, and conducting means connecting the inner of said conductors with said canopy, whereby a potential difference is established between the outer of said conductors disposed in said floor plate and said canopy to give animals of a size greater than that admitted into the trap an electric shock.

JOSEPH J. SHEEHY.

REFERENCES CITED

The following references are of record in the file of this patent:

UNITED STATES PATENTS

| Number | Name | Date |
|---|---|---|
| 1,165,485 | Adams | Dec. 28, 1915 |
| 1,778,884 | Bressan | Oct. 21, 1930 |
| 1,952,795 | Frost | Mar. 27, 1934 |
| 2,302,787 | Meehan | Nov. 24, 1942 |

FOREIGN PATENTS

| Number | Country | Date |
|---|---|---|
| 211,683 | Great Britain | Feb. 28, 1924 |
| 283,632 | Great Britain | Jan. 12, 1928 |
| 522,464 | Great Britain | June 19, 1940 |